UNITED STATES PATENT OFFICE.

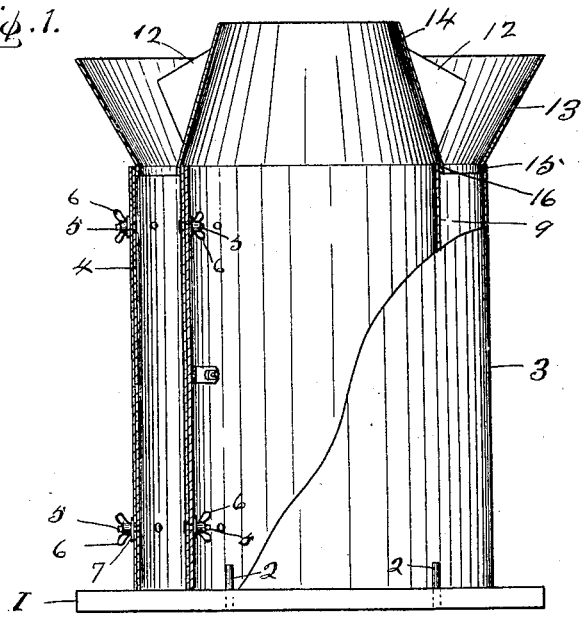
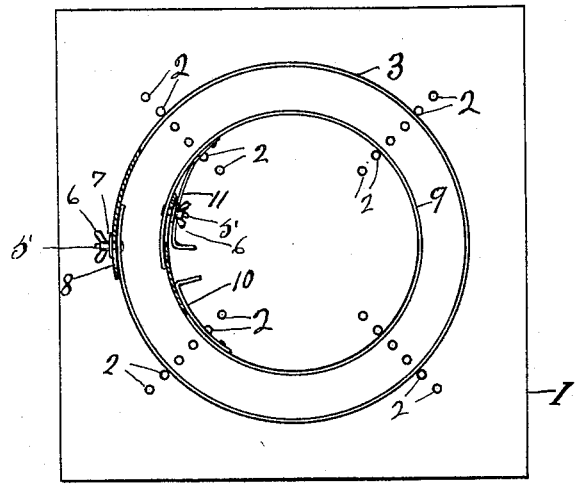

JOHN GROSCOP, OF AUBURN, INDIANA.

MOLD FOR CEMENT TILE.

No. 799,559.  Specification of Letters Patent.  Patented Sept. 12, 1905.

Application filed March 16, 1905. Serial No. 250,375.

*To all whom it may concern:*

Be it known that I, JOHN GROSCOP, a citizen of the United States, residing at Auburn, in the county of Dekalb, in the State of Indiana, have invented certain new and useful Improvements in Molds for Cement Tile; and I do hereby declare that the following is a full, clear, and exact description of the invention, which will enable others skilled in the art to which it appertains to make and use the same, reference being had to the accompanying drawings, which form part of this specification.

My invention relates to improvements in molds for cement tile.

The object of my present invention is to provide a cheap, simple, and efficient mold for use in the manufacture of cement tile so constructed and arranged as to be conveniently adjustable for the manufacture of tile having different diameters and different thicknesses and also so arranged that the outer casing can be conveniently used as the inner casing of another and larger mold and the inside casing can be used as the outside casing of a smaller mold of similar construction.

My invention consists of a cement-tile mold formed of an inner and an outer cylindrical casing in concentric relation when in use, the said two-part casing being removably mounted on a proper pallet provided with a series of centering-pins in spaced radial relation, means for increasing or contracting the diameter of the mold-cylinders and for securing them in their adjusted position, and a novel form of funnel detachably mounted upon the open top of the said two-part casing when in concentric arrangement for use.

Similar reference-numerals indicate like parts in both views of the drawings, in which—

Figure 1 is a side elevation of my invention, partly in central section, showing the relative arrangement of the operative parts when in position in use. Fig. 2 is a plan of the same with the surmounted funnel removed and the molds partly in cross-section to show the means for adjusting the mold for different sizes of tile.

The pallet 1 is a board of any desired dimensions or contour provided upon its upper face with a series of removable and radially-arranged short upright pins 2, preferably in four rows, as shown, and in measured arrangement, preferably spaced one inch apart.

The outer casing 3 of the mold consists of a cylindrical casing of any suitable material, preferably of light soft steel, to give proper elasticity for its required adjustments and also proper hardness to prevent denting in use, having open ends and lapping edges, as shown. The inner one 4 of the lapping edges has a plurality of angular openings, in which are arranged angular bolts 5, whose outer projecting end has its edges screw-threaded in a well-understood manner and adapted to receive the wing-nut 6 and an interposed washer 7. The outer lapping edge of the outer casing 3 has a plurality of horizontal slots 8 coincident with the said respective bolt-openings, whereby the said casing by loosening the nut 6 can be either enlarged or contracted diametrically to the extent of the length of the said slots. The inner cylindrical casing 9 is identical in construction and arrangement, except that it is of less diameter, and is provided upon its inner face, preferably near the middle of its length, with the oppositely-arranged strips 10 and 11, the former having one end fixed to the casing near its overlapping edge and the latter fixed near the underlapping edge. The adjacent ends of these strips are bent at right angles to form handles, by means of which the contraction of the inner cylinder can readily be effected to remove the same when the plastic tile has sufficiently hardened to sustain its own weight.

In the inner casing 9, which has the same arrangement of bolt-openings and slots as the outer casing, the flat head of the bolts 5 are upon its outer face, and the winged nuts 6 are arranged upon the inner face of the casing to make them accessible to the operator when it is desired to release the inner casing and remove the mold from the inclosed and finished tile.

The funnel, which is removably mounted upon my two-part casing and forms a coöperative part of the mold, consists of two cylindrical sections in substantially concentric arrangement rigidly connected by a plurality of radial webs or connecting plates or pieces 12, fixed at each end to the respective sections. The outer of these funnel-sections 13 is outwardly flaring, and the inner section 14 is upwardly contracted, thereby leaving a suitable annular space between them to receive the wet, plastic, and semisolid cement and direct the same downward into the annular space between the mold-casings 3 and 9. This funnel preferably has the lower edge of its outer rim 13 provided with a pendent annular flange 15, adapted to snugly fit within the upper edge of the mold-casing 3, and the inner rim 14 has a pendent flange 16, adapted to snugly fit over the upper edge of the inner casing 9, whereby the funnel is securely but removably mounted on the mold.

It is obvious that the pins 2 are so spaced that the casings 3 and 9 can be centered and rigidly secured against displacement in use from the lateral pressure of the plastic contents of the mold, as shown in Fig. 2.

Having thus described my invention and the manner of employing the same, what I desire to secure by Letters Patent is—

1. In a tile-forming mold or apparatus, an inner and outer upright cylindrical casing in concentric relation with an interposed annular chamber, the said casings being open at both ends; the outer lapping edge of the outer casing having a plurality of slots coincident with bolt-openings in the inner edge adapted to receive securing-bolts by which the cylinder can be expanded or contracted diametrically; a supporting-base for the said mold having a series of radially-arranged removable centering-pins, and a funnel removably mounted upon said casings consisting of two concentric sections oppositely flaring and rigidly connected as described.

2. A tile-forming mold, consisting of two upright open-ended cylindrical casings apertured and slotted as described to admit of their expansion or contraction; the inner casing having the oppositely-arranged strips 10 and 11 constructed as described and adapted with bolts to secure the lapping edges of said inner casing in an expanded or contracted condition; a supporting-base provided with a series of radially-arranged removable centering-pins for securing said casings in their concentric relation against lateral displacement; and a removable funnel for the upper ends of said casings adapted to guide the semisolid material into the tile-forming chambers.

3. The combination in a tile-mold of cylinders adapted to be diametrically expanded or contracted; means for securing the said cylinders in such adjusted relation, constructed as described; a supporting-base provided upon its face with radially-arranged holes to receive removable pins for supporting the two-part casing against lateral displacement by the pressure of the tile during the formation; removable pins adapted for insertion in the holes in said base, and a two-flanged funnel flaring as described, removably mounted upon said casings as shown.

Signed by me at Fort Wayne, county of Allen, State of Indiana, this 13th day of March, A. D. 1905.

JOHN GROSCOP.

Witnesses:
  WATTS P. DENNY,
  AUGUSTA VIBERG.